June 3, 1958　　　　　M. WEBER　　　　2,836,994
INFINITELY VARIABLE FRICTION TRANSMISSION WITH
CONICAL PLANETARY ROLLERS
Filed Aug. 31, 1954　　　　　　　3 Sheets-Sheet 1

INVENTOR:
Max Weber
BY Michael S. Striker

June 3, 1958
M. WEBER
2,836,994
INFINITELY VARIABLE FRICTION TRANSMISSION WITH
CONICAL PLANETARY ROLLERS
Filed Aug. 31, 1954
3 Sheets-Sheet 2
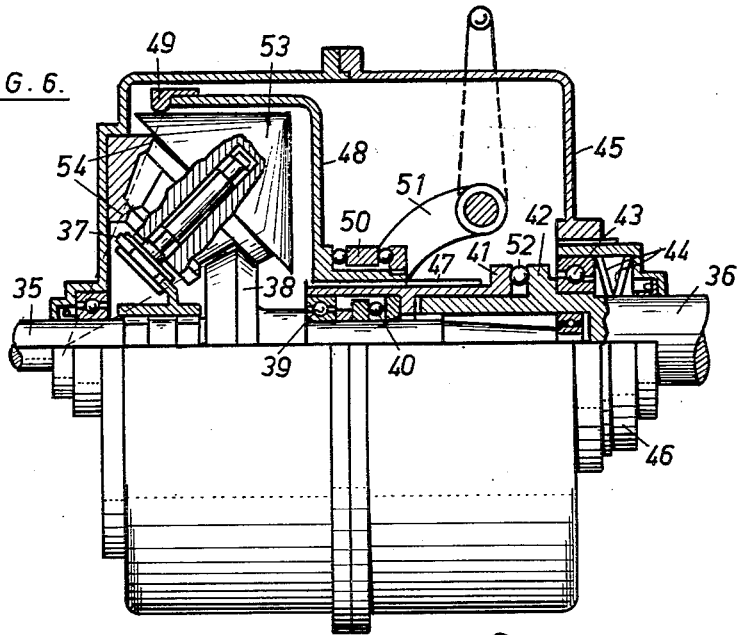
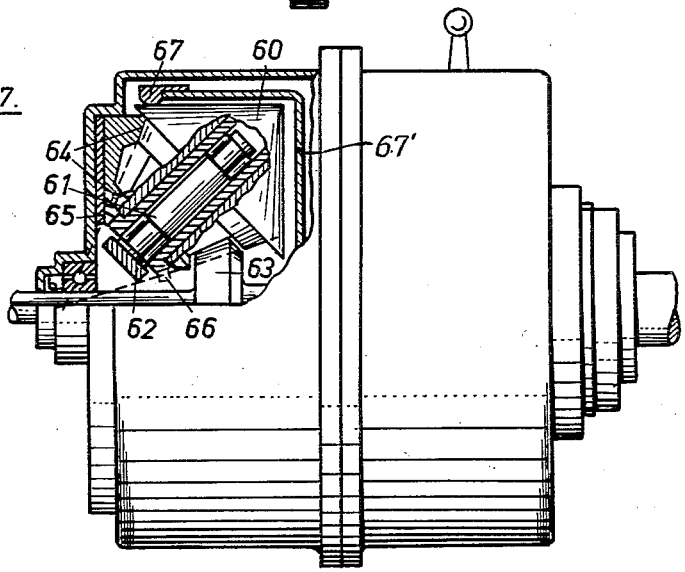
INVENTOR:
Max Weber
By Michael S. Striker
at.

INVENTOR:
Max Weber
By Michael S. Striker
agt.

United States Patent Office 2,836,994
Patented June 3, 1958

2,836,994

INFINITELY VARIABLE FRICTION TRANSMISSION WITH CONICAL PLANETARY ROLLERS

Max Weber, Muhlhofen (Bodensee), Germany

Application August 31, 1954, Serial No. 453,363

Claims priority, application Germany September 10, 1953

5 Claims. (Cl. 74—796)

This invention concerns variable transmissions, and more particularly infinitely variable friction transmissions with conical planetary rollers.

It is a main object of the invention to provide a transmission of the type set forth, operable at high speeds and high torques, without the danger of excessive strain or stress in the cooperating elements due to heat caused for instance by bearing friction or slip.

It is a further object of this invention to provide an infinitely variable transmission operable both in one and the opposite direction.

It is still another object of the invention to provide a transmission of the type set forth which permits to vary the speed on the driven side between zero and a maximum speed, the arrangement being such that even at speed zero on the driven side there is still a force holding the driven shaft against turning.

It is still another object of this invention to provide a transmission of the type set forth in which with decreasing speed of the driven shaft an increasing torque is transmitted, and wherein with increasing torque and axial load the contact pressure of the frictionally engaging parts is increased.

It is a further object of this invention to provide a transmission of the type set forth in which at high speeds of operation a centrifugal effect is obtained by suitable arrangement of the conical rollers so that the contact pressure in the frictional engagement is thereby increased.

With above objects in view, the preferred embodiment of the invention consists in an infinitely variable friction transmission which comprises, in combination, support means; a driven member supported for rotation about its axis by said support means; a deformable friction ring coaxial with said driven member and operatively connected to the latter for transmitting a drive thereto when said friction ring rotates about its axis; a plurality of conical planetary rollers distributed about the axis of said driven member, and being surrounded by and engaging said friction ring; a plurality of bearing means respectively supporting said planetary rollers for respective free rotation about their axes and for respective free movement along their axes under the action of centrifugal force so that when said planetary rollers rotate about the axis of said driven member they will press against said friction ring due to the centrifugal force acting on said rollers; a drive shaft coaxial with said driven shaft and also supported for rotation about its axis by said support means; and turning means cooperating with said drive shaft and said rollers for turning the latter respectively about their axes and simultaneously about the drive shaft axis when said drive shaft rotates, so that the drive from said drive shaft will be transmitted through said rollers to said friction ring and from the latter to said driven member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 6 is a partially sectional lateral view of another embodiment;

Fig. 7 is a partially sectional lateral view of a further embodiment;

Figure 1:
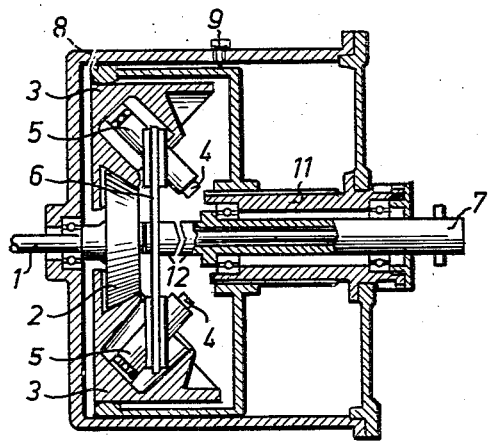
Fig. 1 is a sectional elevation of one embodiment of the invention.

Referring now to Fig. 1, a drive shaft 1 drives the driving cone 2. This driving cone 2 transmits its rotation to the conical rollers 3 which have conical surfaces permanently kept in engagement with the surface of the cone 2. The conical rollers 3 have shaft pins 4 which are rotatably supported in bearings 5. The bearings 5, in turn, are slidably movable in their axial direction in a rotary support 6. The torque introduced by shaft 1 and cone 2 is then transmitted through the conical rollers 3 by means of a deformable friction ring 8 to the rotary support 6. As will be explained, the torque is then transmitted from the rotary support 6 to the driven shaft 7.

The torque transmission in this example is effected by a non-rotating deformable friction ring 8, which is shown in Fig. 1 in a position in which the frictional engagement between the conical rollers 3 and the non-rotating friction ring 8 occurs almost at the tip of the rollers 3 so that the speed of rotation of the member 6 is comparatively slow. Theoretically, if the contact between the rollers 3 and the friction ring 8 could be concentrated to the very point of the rollers 3, the ring 6 would be at a standstill. However, the friction ring 8 is movable in axial direction of the device to the right, as seen in Fig. 1, until the rear shoulder of the friction ring 8 comes to abut against the stop member 9. As the friction ring 8 is moved towards the right, remaining in frictional contact with the rollers 3, the speed of the support 6 and therefore the speed of the driven shaft 7 gradually increases and the maximum speed of the driven member is reached when the friction ring 8 abuts against the stop member 9. The friction ring 8 is supported by a bell-shaped member 8a which is slidable along the hollow shaft 11. Any conventional means may be used for effecting the shift movement of the bell-shaped member 8a with the friction ring 8. In the conventional terminology applicable to planetary gearing, the cone 2 is the driver element, the ring support 6 is the follower element equipped with rollers 3 acting like planet gears, while the non-rotataing ring 8 is the fixed element in engagement with rollers 3 and thereby causing the follower to rotate.

As Fig. 1 shows, the driven shaft 7 is not rigidly connected with the support member 6. A clutch device 12 is interposed between these two elements. The clutch 12 is shown only diagrammatically so as to intimate that this clutch has beveled surfaces so that with increasing load on shaft 7 the mutually engaging beveled surfaces of the clutch device 12 urge the support 6 towards the cone 2. Consequently not only the frictional engagement between the cone 2 and the rollers 3 is increased, but also the conical rollers 3 are urged to move somewhat in direction of the axis of the shaft pins 4 and bearings 5 so that also the frictional engagement between the conical rollers 3 and the friction ring 8 is increased. In this manner with increasing torque an increased frictional engagement is assured.

Slipping of the interengaging members is avoided and a very efficient power transmission is obtained even with increasing loads.

Figure 2:
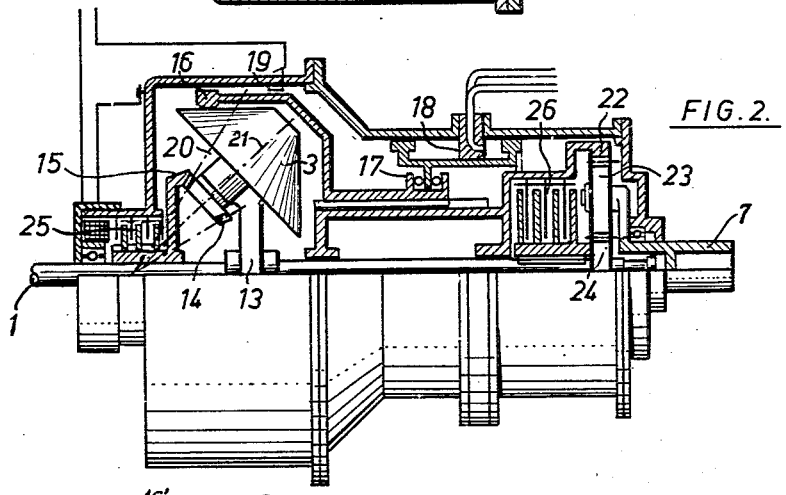
Fig. 2 is a partially sectional lateral view of a modified embodiment.

Referring now to the embodiment shown in Fig. 2, the axis of the conical rollers 3 is oriented in a different direction. This embodiment is especially suitable for the transmission of variable speeds in the range between zero and a maximum, both in one and the opposite direction of turn. The conical rollers 3 are mounted for rotation not only about their own axis 21 but also together with the drive shaft 1. For this purpose, the rollers 3 are mounted in bearings held in a support member 13 rigidly mounted on the drive shaft 1. The shafts, not shown, of the rollers 3 are in this case slidably movable in the direction of their axis 21; on each shaft, not shown, of the conical rollers 3 is arranged in the suitable manner a bevel gear 14 in driving connection with the said shaft, and meshing with a non-rotating bevel gear 15, which however may be moved in the axial direction of shaft 1 for being disengaged. The friction ring 16 which functions generally in a similar manner as in the example of Fig. 1, is carried by a bell-shaped member 17 which is axially movable along its supporting hollow shaft. In Fig. 2, as an example, means for moving the friction ring 16 in either direction are illustrated as comprising a hydraulical device 18 with two chambers acting as means for moving the member 17 in either direction. A reversal of the direction of turn of the driven shaft 7 can be effected in the following manner. If the friction ring 16 is moved into the area marked 19, then the direction of the rotation of shaft 7 is opposite to the direction of rotation of shaft 1, however if the friction ring 16 is moved to the left, as seen in Fig. 2, then the direction of rotation of shafts 1 and 7 is the same. The axial reversal of the directions of rotation occurs when the friction ring passes through the line indicated as 20. The line 20 is situated in the plane of the axes of shaft 1 and rollers 3, and this line is part of the pitch-cone of the bevel gear 15. The gear pitch line 20 is to be selected in such a manner that the axis 21 of the bevel rollers 3 intersect with the line 20 and with the center line of the driving shaft 1 in one common point.

The friction ring 16 transmits its rotation and speed to the internal gear 22 by means of the carrier device 17 and the above-mentioned hollow shaft. The gear 22 may transmit the rotation by means of a regular planetary gear to the shaft 7, the planetary gear drive consisting of gears 23 and a gear 24 concentric with shaft 7. In the embodiment as shown in Fig. 2 further means are shown for a direct drive connection between the driving shaft and the driven shaft 7 which means may be used when the deformable friction ring 16 is moved into a position in which the range of adjustment is exhausted. In that case a clutch 25, for instance operated electrically, disengages the gear 15 from the bevel gear 14 so that the whole arrangement of conical rollers rotates freely with shaft 1, while a clutch 26 connects the driving shaft 1 directly with the driven shaft 7. Applying again the terminology of planetary gearing, the non-rotating gear 15 is the fixed element which is in engagement with the roller-gear assembly 3, 14 which acts like a set of planet gears and is carried by the driver element 13, while the ring 16, being in engagement with the roller 3, acts as the follower element in conjunction with gear 22 which transmits the drive.

Figures 3, 4, 5:
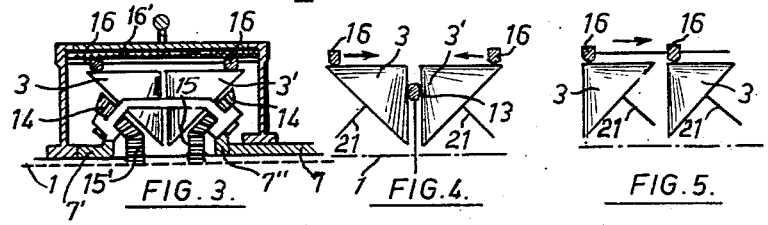
Figs. 3–5 are diagrammatical, partly sectional views illustrating modifications of certain details of the embodiments shown by Figs. 1 and 2.

Figs. 3–5 show other possibilities of arranging the friction rings in relation with the conical rollers.

According to Fig. 3 the conical rollers 3 are supported by a gear 15' attached to the drive shaft 1 for rotation therewith, the gear 15 meshing with the bevel gears 14 of the roller 3'. The two non-rotary friction rings 16 constitute the counter-support of the rollers 3 and are slidingly movable in axial direction of the device. They are moved by means of threaded cylindrical member 16' in directions opposite to each other for the purpose of changing the speed. Actually, this embodiment is a tandem arrangement of two planetary transmissions. The gears 15, 15' are the driver elements, while the friction rings 16 are the fixed elements in engagement with the rollers 3, 3', respectively, so that the parts 7', 7'' carrying the rollers 3, 3', respectively, and being connected with the driven shaft 7 act as the follower element for both transmissions which are simultaneously and equally controlled by the shift of the rings 16.

According to the embodiment of Fig. 4 based on the same principle the two conical rollers 3 and 3' are driven frictionally by the ring member 13 attached to shaft 1 instead of the gears 14, 15, 15' and drive the rings 16. The same principle as in Fig. 3 applies to the arrangement shown in Fig. 5, however, here the rings 16 are movable jointly in one direction for changing the speed.

Fundamentally, all the conical rollers shown in Figs. 1–9 may be forced against the friction ring and drive member 8 (Fig. 1) either only by centrifugal force or by mechanical pressure, or by a combination of both.

In the embodiments shown by Figs. 2 and 3 for instance the conical rollers 3 are intended to be forced into contact with the friction rings 16 by centrifugal force created at high speed operation.

The diagrammatic Figs. 4 and 5 illustrate two arrangements of the conical rollers 3 which may be pressed against the friction rings 16 in either manner. It is evident that at low speeds the contact pressure is produced by axial force through a driving cone, while at high speeds the centrifugal force may be the primary factor.

Fig. 6 shows the general structure of an embodiment in which the driving shaft 35 is supported at one end inside the driven shaft 36 which is formed as a hollow shaft, and at the other end in a bearing in the housing. The roller carrier 37 is carried freely turnable and axially shiftable on the driving shaft 35. However, the driving cone 38 is solidly attached to the driving shaft 35 and both are axially supported by the clutch couplings 41 and 42 by means of the ball bearings 39 and 40. Corresponding to load pressure the clutch coupling is preloaded through a thrust bearing 43 by means of spring discs 44, the preload being adjustable from without by a nut 46 in the housing 45. The two parts 42, 43 of the coupling are telescoped into each other for the purpose of mutual alignment, and the exterior part 41 is provided with splines 47 along which the adjusting sleeve 48 with the exterior friction ring 49 is displaceable by means of a non-rotary control ring 50 and an associated hand lever 51 for adjusting the speed.

Figure 8:
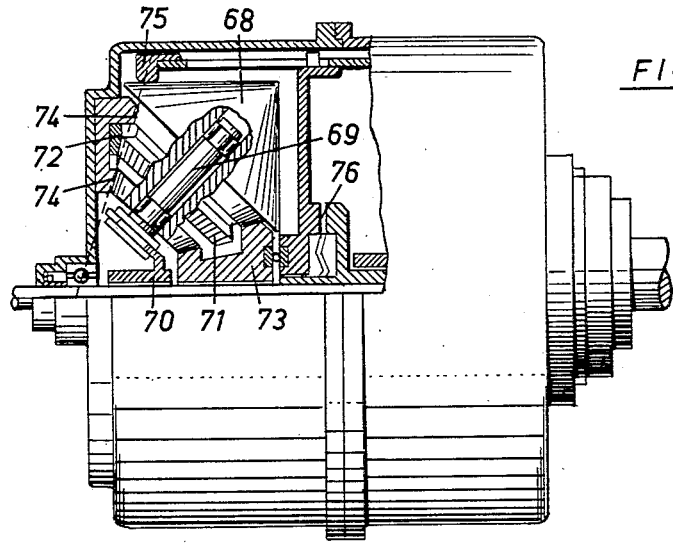
Fig. 8 is a partially sectional lateral view of still another embodiment.

Between the two parts 41, 42 of the clutch coupling which are provided with well matched clutch teeth as shown at 76 in Fig. 8, balls 52 are located for the purpose of easy response of the rollers 53, the balls 52 and slanting surfaces of the teeth tending to move the coupling flanges apart upon the introduction of a torque and thus maintaining the driving cone 38 under axial pressure even at zero speed as at the moment of starting, or at zero load. The driving cone 38 presses the rollers 53 along the two lateral supporting rings 54 outwardly against the exterior friction ring 49 made of deformable material, which is then deformed during rotation by the contact pressure corresponding to the number of rollers. With this deformation, the radial contact pressure and centrifugal force cause together the input power to be transmitted to the driven shaft 36 in correspondence to the displacement of the exterior friction ring 49 by means of lever 51, through the couplings 41 and 42. The rollers 53 rotate without load on their bearings because the roller carrier 37 is axially shiftable on the shaft 35 and therefore adjusts itself to the position of the rollers 53 relative to the lateral supporting surfaces 54 and to the exterior driving ring 49.

Fig. 7 shows a transmission of the same construction generally as that shown in Figs. 1 and 6, but with the difference, that the rollers 60 are rotatably and axially displaceably carried by journals 61 mounted on a freely floating ring 62 and are pressed against the lateral supporting faces 64 by a driving cone 63, whereby a torque is created by the lateral stationary supporting bevel gear 65 being engaged with bevel gears 66 fixed to the rollers 60. The bearings of the rollers 60 are entirely free of any load and the journals 61 serve only for spacing the rollers from each other, while the actual contact forces and the centrifugal forces are directly transmitted from the body of the rollers to the exterior friction ring 67. In both the embodiments of Figs. 6 and 7 the cone 38 (or 63, respectively) is the driver element and in driving engagement with the adjacent conical shank portion of roller 53 (or 60, respectively). The fixed element is the stationary supporting ring 54 (or 64, respectively). The member 37 (or 62, respectively) is an idler, and the friction ring 49 and bell 48 (or 67 and 67', respectively) are the follower members. In Fig. 7 the gears 65, 66 serve only to supplement the frictional engagement between the roller 60 and the supporting ring surface 64.

Fig. 8 shows a transmission of the same construction generally as that shown by Fig. 6, but with the difference that the rollers 68 are rotatably and axially displaceably carried on journals 69 and the latter are fixed on a roller carrier 70. This roller carrier 70 is supported for rotation together with the driving shaft, but axially displaceable in splines and transmits the input torque by means of bevel gears 71 fixed on the rollers 68, to a bevel gear 72 fixed on a lateral supporting member, while the contact force depending on load is transmitted through transfer ring 73 rotating freely on the driving shaft, and then radially to the exterior friction ring 75 through the body of the rollers 68, which are supported by the lateral supporting surfaces 74.

Also in this embodiment the bearings of the rollers 68 are entirely free of any load and the gears are free of stress.

Figure 9:
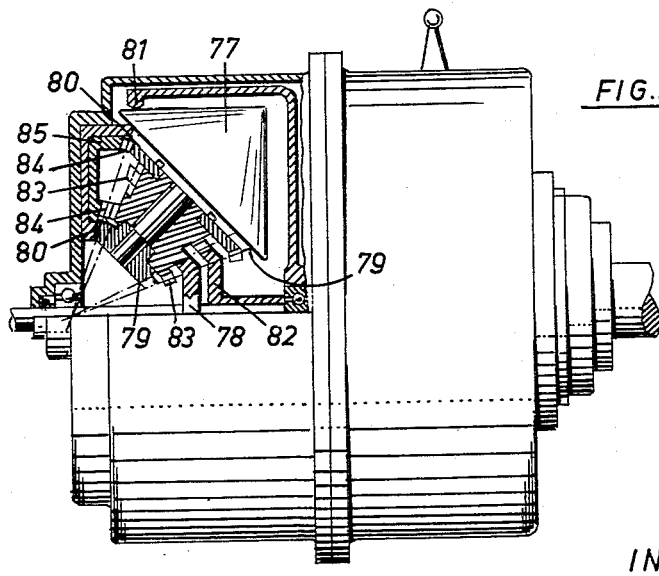
Fig. 9 is a partially sectional lateral view of a further embodiment.

Fig. 9 shows an embodiment of the same construction generally as that shown by Fig. 6, but with the difference, that the rollers 77 are without bearing supports and are supported only on one side by a contact cone 78 which transmits a force depending on prevailing load to the roller shank and presses the latter against the lateral supporting surfaces 80, which force is then transmitted in addition to the centrifugal force to the exterior friction ring 81, while the torque is transmitted by a gear 82 fixed on the driving shaft and gears 83 fixed on the rollers, to the supporting gear 84 likewise fixed on the rollers 77, and finally to the lateral stationary bevel gear 85. The spacing of the rollers 77 is determined exclusively by the gears, the rollers and the lateral supporting surfaces, considering the play between the gears allowing a tilting movement; consequently, the number of the teeth of the supporting gears must be an integral multiple of the number of rollers. Two degrees of freedom of the rollers exist in axial and radial direction so that the rollers are free of stress in spite of changing contact forces and centrifugal forces.

It should be understood that the object of the invention is achieved in two ways, in one way through the contact pressure against the friction ring depending on load and in the other way by the transmission of speed resulting from the action of driving cones or gears, the latter way being free of fluctuations of pressure.

It will be understood that each of the elements described above, or two or more together, may also find a useful application in other types of variable transmissions differing from the types described above.

While the invention has been illustrated and described as embodied in infinitely variable friction transmission, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An infinitely variable friction transmission comprising, in combination, support means; a driven member supported for rotation about its axis by said support means; a deformable friction ring coaxial with said driven member and operatively connected to the latter for transmitting a drive thereto when said friction ring rotates about its axis; a plurality of conical planetary rollers distributed about the axis of said driven member, and being surrounded by and engaging said friction ring; a plurality of bearing means respectively supporting said planetary rollers for respective free rotation about their axes and for respective free movement along their axes under the action of centrifugal force so that when said planetary rollers rotate about the axis of said driven member they will press against said friction ring due to the centrifugal force acting on said rollers; a drive shaft coaxial with said driven shaft and also supported for rotation about its axis by said support means; and turning means cooperating with said drive shaft and said rollers for turning the latter respectively about their axes and simultaneously about the drive shaft axis when said drive shaft rotates, so that the drive from said drive shaft will be transmitted through said rollers to said friction ring and from the latter to said driven member.

2. An infinitely variable friction transmission comprising, in combination, support means; a driven member supported for rotation about its axis by said support means; a deformable friction ring coaxial with said driven member and operatively connected to the latter for transmitting a drive thereto when said friction ring rotates about its axis; a plurality of conical planetary rollers distributed about the axis of said driven member, and being surrounded by and engaging said friction ring; a plurality of bearing means respectively supporting said planetary rollers for respective free rotation about their axes and for respective free movement along their axes under the action of centrifugal force so that when said planetary rollers rotate about the axis of said driven member they will press against said friction ring due to the centrifugal force acting on said rollers; a drive shaft coaxial with said driven shaft and also supported for rotation about its axis by said support means; turning means cooperating with said drive shaft and said rollers for turning the latter respectively about their axes and simultaneously about the drive shaft axis when said drive shaft rotates, so that the drive from said drive shaft will be transmitted through said rollers to said friction ring and from the latter to said driven member; and pressing means operatively connected to said rollers and driven member for pressing said rollers against said friction ring with an increasing force as a load connected to said driven member increases.

3. An infinitely variable friction transmission comprising, in combination, support means; a driven member supported for rotation about its axis by said support means; a deformable friction ring coaxial with said driven member and operatively connected to the latter for transmitting a drive thereto when said friction ring rotates about its axis; a plurality of conical planetary rollers distributed about the axis of said driven member, and being surrounded by and engaging said friction ring; a plurality of bearing means respectively supporting said planetary rollers for respective free rotation about their axes and for respective free movement along their axes under the action of centrifugal force so that when said planetary rollers rotate about the axis of said driven member they will press against said friction ring due to the centrifugal force acting on said rollers; a drive shaft coaxial with said driven shaft and also supported about its axis by said support means; and turning means cooperating with said drive shaft and said rollers for turning the latter respectively about their axes and simultaneously about the drive shaft axis when said drive shaft rotates, so that the drive from said drive shaft will be transmitted through said rollers to said friction ring and from the latter to said driven member, said turning means including a first annular motion transmitting member coaxial with said drive shaft and stationary with respect to said support means and a plurality of second annular motion transmitting members respectively fixed coaxially to said rollers and operatively engaging said first motion transmitting member to roll thereon during rotation of said rollers about the drive shaft axis so as to rotate said rollers respectively about their axes.

4. An infinitely variable friction transmission comprising, in combination, support means; a driven member supported for rotation about its axis by said support means; a deformable friction ring coaxial with said driven member and operatively connected to the latter for transmitting a drive thereto when said friction ring rotates about its axis; a plurality of conical planetary rollers distributed about the axis of said driven member, and being surrounded by and engaging said friction ring; a plurality of bearing means respectively supporting said planetary rollers for respective free rotation about their axes and for respective free movement along their axes under the action of centrifugal force so that when said planetary rollers rotate about the axis of said driven member they will press against said friction ring due to the centrifugal force acting on said rollers; a drive shaft coaxial with said driven shaft and also supported for rotation about its axis by said support means; and turning means cooperating with said drive shaft and said rollers for turning the latter respectively about their axes and simultaneously about the drive shaft axis when said drive shaft rotates, so that the drive from said drive shaft will be transmitted through said rollers to said friction ring and from the latter to said driven member, said turning means including a first ring gear coaxial with said drive shaft and a plurality of second gears fixed coaxially to said rollers and meshing with said first gear; and means for releasably maintaining said first gear stationary with respect to said support means.

5. An infinitely variable friction transmission comprising, in combination, support means; a driven member supported for rotation about its axis by said support means; a deformable friction ring coaxial with said driven member and operatively connected to the latter for transmitting a drive thereto when said friction ring rotates about its axis; a plurality of conical planetary rollers distributed about the axis of said driven member, and being surrounded by and engaging said friction ring; a plurality of bearing means respectively supporting said planetary rollers for respective free rotation about their axes and for respective free movement along their axes under the action of centrifugal force so that when said planetary rollers rotate about the axis of said driven member they will press against said friction ring due to the centrifugal force acting on said rollers; a drive shaft coaxial with said driven shaft and also supported for rotation about its axis by said support means; turning means cooperating with said drive shaft and said rollers for turning the latter respectively about their axes and simultaneously about the drive shaft axis when said drive shaft rotates, so that the drive from said drive shaft will be transmitted through said rollers to said friction ring and from the latter to said driven member; and adjusting means operatively connected to said friction ring for shifting the same axially so as to vary the position of said friction ring with respect to said rollers in order to vary the transmission.

References Cited in the file of this patent
UNITED STATES PATENTS

| | | |
|---|---|---|
| 888,761 | Snyder | May 26, 1908 |
| 1,517,722 | Gerdes | Dec. 2, 1924 |
| 1,629,902 | Arter et al. | May 24, 1927 |
| 1,867,843 | Joyce | July 19, 1932 |
| 1,887,505 | Gibson | Nov. 15, 1932 |
| 2,029,042 | Turner | Jan. 28, 1936 |
| 2,062,901 | Graham | Dec. 1, 1936 |
| 2,114,245 | Bade | Apr. 12, 1938 |
| 2,574,530 | Castagna | Nov. 13, 1951 |
| 2,759,375 | Legros | Aug. 21, 1956 |